United States Patent
Essig et al.

(10) Patent No.: US 6,716,297 B2
(45) Date of Patent: Apr. 6, 2004

(54) METHODS AND APPARATUSES FOR DETACHING COMPONENTS ADHESIVELY BONDED TO ONE ANOTHER

(75) Inventors: Oliver Essig, Winnenden (DE); Martin Hartweg, Erbach (DE); Anja Keller, Gäufelden-Nebringen (DE); Silvia Tomaschko, Ulm (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/526,342

(22) Filed: Mar. 16, 2000

(65) Prior Publication Data

US 2003/0127174 A1 Jul. 10, 2003

(30) Foreign Application Priority Data

Mar. 17, 1999 (DE) .......................................... 199 11 779

(51) Int. Cl.$^7$ ................................................ B32B 35/00
(52) U.S. Cl. ..................... 156/344; 156/584; 156/98; 29/402.03; 29/426.4
(58) Field of Search ..................... 156/344, 584, 156/94, 98; 29/402.03, 402.08, 426.4

(56) References Cited

U.S. PATENT DOCUMENTS

| | | | | |
|---|---|---|---|---|
| 3,719,543 A | * | 3/1973 | Harris ......................... | 156/584 |
| 4,248,232 A | * | 2/1981 | Engelbrecht et al. ........ | 606/169 |
| 4,868,237 A | * | 9/1989 | Hoff et al. .................. | 524/407 |
| 5,100,494 A | * | 3/1992 | Schmidt ...................... | 156/344 |
| 5,123,902 A | * | 6/1992 | Muller et al. ................. | 604/21 |
| 5,163,933 A | * | 11/1992 | Grundfest .................... | 606/99 |
| 5,221,282 A | * | 6/1993 | Wuchinich ................... | 606/99 |
| 5,269,868 A | * | 12/1993 | Gofuku et al. .............. | 156/344 |
| 5,296,083 A | * | 3/1994 | Petino ......................... | 156/344 |
| 5,358,505 A | * | 10/1994 | Wuchinich ................... | 606/99 |
| 5,382,251 A | * | 1/1995 | Hood et al. ................... | 606/99 |
| 5,413,578 A | * | 5/1995 | Zahedi .......................... | 606/86 |
| 5,421,943 A | * | 6/1995 | Tam et al. ................ | 156/273.9 |
| 5,807,383 A | * | 9/1998 | Kolesa et al. .................. | 606/7 |
| 5,840,075 A | * | 11/1998 | Mueller et al. ................. | 606/7 |
| 5,895,589 A | * | 4/1999 | Rogers et al. ........ | 219/121.76 |
| 5,976,955 A | * | 11/1999 | Hodges ...................... | 156/247 |
| 6,558,493 B1 | * | 5/2003 | Ledger et al. ................. | 156/98 |
| 2001/0042387 A1 | * | 11/2001 | Ikushima et al. ............. | 65/378 |

* cited by examiner

Primary Examiner—Mark A. Osele
(74) Attorney, Agent, or Firm—Kenyon & Kenyon

(57) ABSTRACT

The invention relates to methods and apparatuses for separating components adhesively bonded to one another wherein transmitters for mechanical vibrations, in particular for ultrasound, and/or for electromagnetic radiation, in particular laser light, are placed in the region of an adhesive join between the components. An adhesive bond in the adhesive join is acted upon by the vibrations or radiation, and the adhesive and optionally one of the components joined therewith are excited, as a result of which the adhesive effect of the adhesive bond is at least reduced. Alternatively or in addition thereto, transmitters can also be permanently placed in the region of the adhesive join at the time the components are adhesively bonded.

36 Claims, 2 Drawing Sheets

METHODS AND APPARATUSES FOR DETACHING COMPONENTS ADHESIVELY BONDED TO ONE ANOTHER

FIELD OF THE INVENTION

The invention relates to methods for detaching components adhesively bonded to one another and apparatuses for detaching components adhesively bonded to one another.

BACKGROUND OF THE INVENTION

In industry and especially in its model-making sector, adhesive bonding is being used more and more extensively to join components. This applies in particular to the bodywork of motor vehicles and/or aircraft. It is in some cases very difficult and expensive, however, to separate (for example for repair purposes) components adhesively bonded to one another, in particular to separate windshields from motor vehicle bodies. Adhesive bonds whose bonding surfaces have a complex geometry are also difficult. Since adhesive bonds are separated, for example, with knives, scrapers, or wires, these operations are moreover also hazardous in terms of injury. In specific cases, for example if the geometry of the adhesive join is complex, wires are currently also used in many cases.

SUMMARY OF THE INVENTION

It is an object of the invention to make available methods and apparatuses with which components adhesively bonded to one another can be separated in as simple and economical a fashion as possible, even if the geometry of the join surfaces is complex.

The present invention provides a method for separating components adhesively bonded to one another, wherein a transmitter for mechanical vibrations, in particular for ultrasound, is placed in the region of the adhesive join; by way of the transmitter, the adhesive bond is acted upon by the vibrations, in particular by the ultrasound; that the vibrations cause excitation of the adhesive and/or of at least one of the components joined with the adhesive; and that as a result of the vibrations, the adhesive effect of the join is at least reduced in the region of the interface between the adhesive and a component and/or between the transmitter and the adhesive.

The application to the adhesive join of mechanical vibrations, in particular vibrations in the form of ultrasound, and of electromagnetic radiation, in particular laser radiation, results in premature aging and thus fatiguing of the adhesive join. Fatiguing of the adhesive join can result, for example, from a change in the chemical and/or physical structure of the adhesive. Because of this fatiguing, the join is then at least easier to detach. The invention thus makes it possible, inter alia, to save time and expense. In addition, it also makes it possible to separate adhesively bonded components conveniently and at least with less risk to the worker.

In particular, the exciting frequency of the vibration or the radiation is matched to the adhesive being used in such a way that the reduction in adhesive effect can be achieved as quickly as possible. The reduction in adhesive effect preferably occurs at different interfaces depending on the material combinations and/or selected frequency of the vibration or radiation.

DETAILED DESCRIPTION

Figure 1:
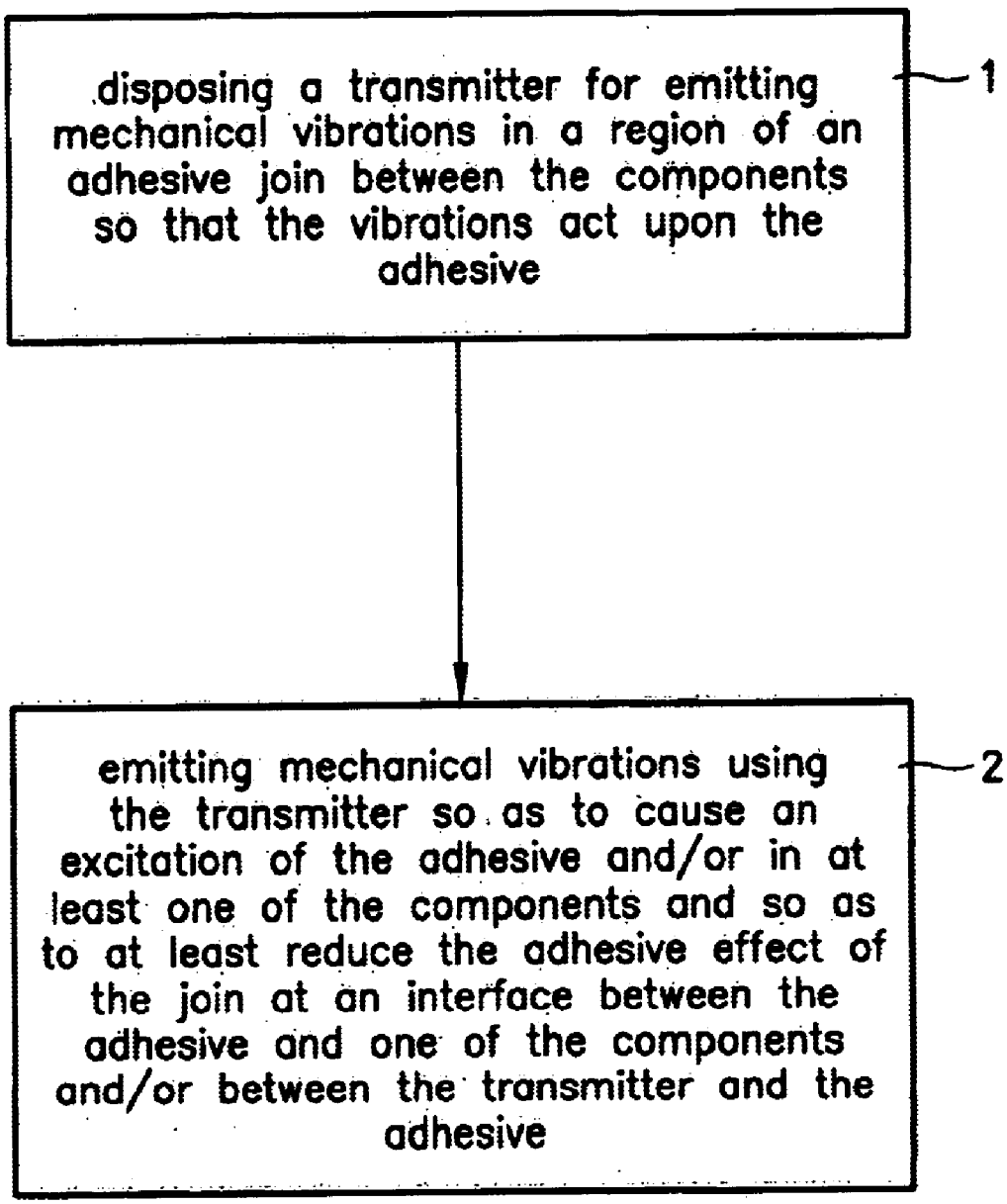
FIG. 1 shows a flow chart of a method according to the present invention.

Referring to FIG. 1, in the first step, block 1, a transmitter is disposed for emitting mechanical vibrations in a region of an adhesive join between the components so that the vibrations act upon the adhesive. In the second step, block 2, mechanical vibrations are emitted using the transmitter so as to cause an excitation of the adhesive and/or in at least one of the components and so as to at least reduce the adhesive effect of the join at an interface between the adhesive and one of the components and/or between the transmitter and the adhesive.

Figure 2:
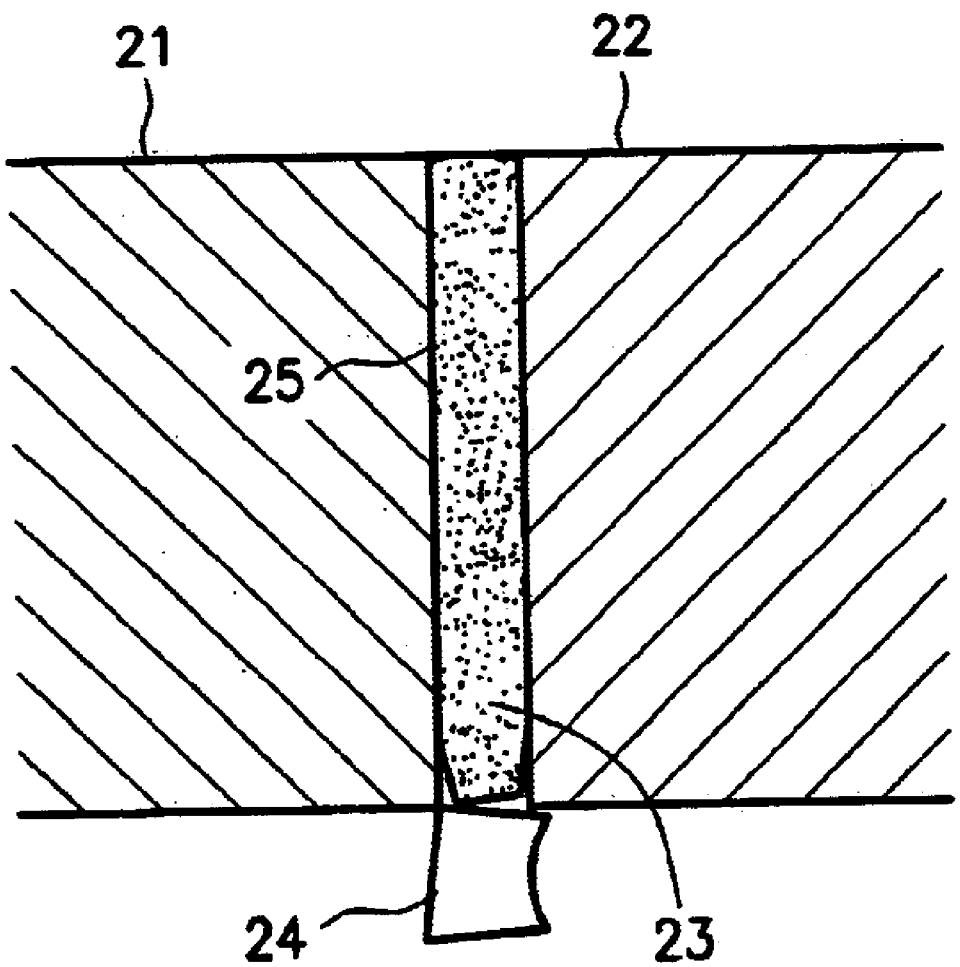
FIG. 2 shows a schematic representation of an apparatus according to the present invention.

FIG. 2 shows a schematic representation of an apparatus according to the present invention. Two components 21 and 22, are shown bonded together by an adhesive 23 at an adhesive join 25 between the two components. A transmitter 24 for emitting mechanical vibrations is disposed in a region of the adhesive join 25.

When mechanical vibrations are used, three scenarios in particular may be emphasized:

1) If the transmitter and the adhesive do not vibrate, a break usually occurs in the region of the interface between the transmitter and the adhesive.
2) If the transmitter and the adhesive vibrate but the component does not, then a break usually occurs in the region of the interface between the component and the adhesive.
3) If the component and the adhesive do not vibrate, then a fracture usually occurs in the region of the interface between the component and the adhesive.

To effect separation of the adhesive bonds using mechanical vibration it is possible, for example, to place an ordinary ultrasound resonator at an accessible point on the surface of a component, for example a windshield of a motor vehicle, and to introduce into the adhesive bond the vibration which brings about accelerated aging. The accelerated aging of the adhesive bond deliberately performed in this context can result, in particular, in embrittlement and/or hardening of the adhesive.

Alternatively or in addition to this feature, there exists the possibility of placing in the region of the adhesive bond—and in particular in the adhesive itself or, for example, in an adjacent seal—piezoelectric elements that, as required, can be stimulated from outside to vibrate. This placement of the piezoelectric elements can be accomplished when the components are first adhesively bonded.

Instead of introducing mechanical vibrations, in this case particularly ultrasound, the reduction in the adhesive effect and, in particular, elimination thereof, can be accomplished by applying an electromagnetic radiation, in particular a laser light, to the adhesive. In this context, the radiation advantageously has a wavelength that is at least partially absorbed by the adhesive.

Absorption causes the adhesive to take in energy, as a result of which its adhesive effect is at least reduced and, in particular, eliminated. The reduction is caused by the fact that as a result of the influence of the radiation on the adhesive, the latter is aged in accelerated fashion. The accelerated aging can result, in particular, in embrittlement and/or hardening and/or incipient or complete carbonization of the adhesive.

Application of the electromagnetic radiation to the adhesive can be accomplished using two exemplary apparatuses and/or a combination thereof, as described below.

In the case of the first exemplary apparatus, it can be advantageous if small semiconductor lasers are permanently placed corresponding in the region of the adhesive join, this being done during the actual adhesive bonding of the components to one another. It can be advantageous in this context that the radiation of the transmitter or of the semiconductor laser(s) can arrive on or in the adhesive with as little interference as possible. Therefore, the transmitters can, for example, be placed directly in the adhesive or directly adjacent to it, for example in a seal. The power leads and optionally control leads of the transmitter can be advantageously routed in such a way that they are later accessible from the outside.

The second exemplary apparatus is an apparatus that is not placed directly on the adhesively bonded component. This apparatus has a transmitter, in particular a laser, whose radiation is delivered onto the adhesive join by way of a guide, preferably a glass fiber. In the region of the adhesive, the radiation emerges from an exit surface of the guide in such a way that the adhesive is irradiated with the radiation.

With an apparatus of this kind, the exit surface of the guide is moved along the adhesive join while the transmitter is operating, and the adhesive is progressively acted upon by the radiation. One of the advantages of this apparatus is that it can be used with a great deal of flexibility. One example of a possible area of use is therefore repair facilities.

Instead of one guide having a single exit surface for the radiation, in many cases it may be advisable to use a guide that has multiple glass fibers and/or glass fiber bundles that are movable with respect to one another. A guide of this kind thus also has multiple exit surfaces for the radiation, which also are movable relative to one another.

An apparatus having a guide of this kind is advantageous in particular for adhesive joins that have profiles with complex geometry and/or in which the adhesive join is difficult to access. That is because in such cases the exit surfaces of the guide can be positioned simultaneously at several points on the adhesive join or also along the entire extent of the adhesive join. As compared to the approach using the guide having only one exit surface for the radiation, in this case it is necessary to move along the adhesive join only locally or in fact not at all.

With all of the methods and apparatuses according to the present invention, it may be advantageous, depending on the materials and/or the vibration or radiation used, to adjust the temperature of the region of the adhesive join (and in that context advantageously of the adhesive), so as to establish a temperature that lies below any glass transition temperature that may exist for the adhesive that is used.

Exemplary areas of application of the invention exist in automotive engineering, in particularly in body and chassis construction. It is particularly advantageous for use with vehicle body panels that are adhesively bonded to one another, especially in automobile construction or in aviation. Its use is also advantageous in the context of adhesively bonded-in window panels, in particular windshields.

A further area of application for the invention is in cutting out individual plates or panels in controlled and rapid fashion, as may be necessary in particular for the provision of emergency exits, for example in aircraft or buses.

What is claimed is:

1. A method for separating two components adhesively bonded to one another by an adhesive, the method comprising:
    disposing a transmitter for emitting mechanical vibrations in a region of an adhesive join between the components so that the vibrations act upon the adhesive; and
    emitting mechanical vibrations using the transmitter so as to cause an excitation of the adhesive and/or in at least one of the components and so as to at least reduce the adhesive effect of the join at an interface between the adhesive and one of the components and/or between the transmitter and the adhesive;
    wherein the disposing is performed at a time the components are adhesively bonded to one another.

2. A method for separating two components adhesively bonded to one another by an adhesive, the method comprising:
    disposing a transmitter for emitting mechanical vibrations in a region of an adhesive join between the components so that the vibrations act upon the adhesive;
    emitting mechanical vibrations using the transmitter so as to cause an excitation of the adhesive and/or in at least one of the components and so as to at least reduce, by causing at least one of an embrittling and a hardening of the adhesive the adhesive effect of the join at an interface between the adhesive and one of the components and/or between the transmitter and the adhesive; and
    cooling the region of the adhesive join before and/or during emitting of the vibrations.

3. The method as recited in claim 2, wherein the cooling is performed to a temperature below a glass transition temperature of the adhesive.

4. A method for separating two components adhesively bonded to one another by an adhesive, the method comprising:
    irradiating a region of the adhesive with an electromagnetic radiation using a transmitter, wherein the transmitter is positioned directly in or adjacent to the adhesive, so that the radiation is at least partially absorbed by the adhesive and so that, by causing at least one of an embrittling and a hardening of the adhesive, an adhesive effect of the adhesive is at least reduced as a result of the absorbed radiation, the electromagnetic radiation having a wavelength selected in accordance with the adhesive.

5. The method as recited in claim 4 wherein the electromagnetic radiation includes laser light.

6. The method as recited in claim 4 wherein the transmitter includes a semiconductor laser.

7. A method for separating two components adhesively bonded to one another by an adhesive, the method comprising:
    irradiating a region of the adhesive with an electromagnetic radiation using a transmitter so that the radiation is at least partially absorbed by the adhesive and so that an adhesive effect of the adhesive is at least reduced as a result of the absorbed radiation; and
    disposing the transmitter in a region of an adhesive join between the components at a time the components are adhesively bonded to one another.

8. The method as recited in claim 7 wherein the region of the adhesive join is a region of the adhesive.

9. An apparatus for separating two components adhesively bonded to one another, the components having an adhesive join with an adhesive arranged therebetween, the apparatus comprising at least one transmitter for emitting mechanical vibrations, the transmitter being disposed in a region of the adhesive join;
    wherein the transmitter is permanently disposed in the region of the adhesive join.

10. The apparatus as recited in claim 9 wherein the region of the adhesive join is a region of the adhesive.

11. The apparatus as recited in claim 10 wherein the region of the adhesive is in the adhesive.

12. An apparatus for separating two components adhesively bonded to one another, the components having an adhesive join with an adhesive arranged therebetween, the apparatus comprising a transmitter for emitting electromagnetic radiation in a region of the adhesive, wherein the transmitter is positioned directly in or adjacent to the adhesive, the emitted radiation having a wavelength that is at least partially absorbed by the adhesive for causing at least one of an embrittling and a hardening of the adhesive, the wavelength selected in accordance with the adhesive.

13. The apparatus as recited in claim 12 wherein the transmitter includes a light source.

14. The apparatus as recited in claim 13 wherein the light source includes a laser.

15. The apparatus as recited in claim 14 where the laser includes a semiconductor laser.

16. The apparatus as recited in claim 12 further comprising a guide for the radiation, the guide connecting the transmitter to the region of the adhesive.

17. The apparatus as recited in claim 16 wherein the transmitter includes a light source and wherein the guide has at least one fiber.

18. The apparatus as recited in claim 17 wherein the light source includes a laser.

19. The apparatus as recited in claim 18 wherein the guide includes a plurality of glass fibers and/or bundles of glass fibers, the glass fibers being moveable with respect to one another.

20. An apparatus for separating two components adhesively bonded to one another, the components having an adhesive join with an adhesive arranged therebetween, the apparatus comprising a transmitter for emitting electromagnetic radiation in a region of the adhesive, the emitted radiation having a wavelength that is at least partially absorbed by the adhesive;
wherein the transmitter is permanently placed in the region of the adhesive join.

21. The apparatus as recited in claim 20 wherein the region of the adhesive join is a region of the adhesive.

22. The apparatus a recited in claim 21 wherein the region of the adhesive is in the adhesive.

23. A method for separating two components adhesively bonded to one another by an adhesive, the method comprising:
disposing a transmitter for emitting mechanical vibrations in a region of an adhesive join between the components so that the vibrations act upon the adhesive, wherein the disposing is performed at a time the components are adhesively bonded to one another; and
emitting mechanical vibrations using the transmitter so as to cause an excitation of the adhesive and/or in at least one of the components and so as to at least reduce the adhesive effect of the join at an interface between the adhesive and one of the components and/or between the transmitter and the adhesive, wherein a frequency of the mechanical vibrations is selected in accordance with the adhesive.

24. An apparatus for separating two components adhesively bonded to one another, the components having an adhesive join with an adhesive arranged therebetween, the apparatus comprising at least one transmitter for emitting mechanical vibrations, the transmitter being disposed in a region of the adhesive join, the transmitter configured to emit mechanical vibrations so as to cause an excitation of the adhesive and/or in at least one of the components and so as to at least reduce, by causing at least one of an embrittling and a hardening of the adhesive, the adhesive effect of the join at an interface between the adhesive and one of the components and/or between the transmitter and the adhesive, wherein a frequency of the mechanical vibrations is selected in accordance with the adhesive.

25. A method for detaching components adhesively bonded to each other, comprising the steps of:
situating a piezoelectric element for mechanical vibrations in the region of the adhesive seam;
previously permanently situating the piezoelectric element in the region of the adhesive joint when the components are adhesively bonded to each other;
acting upon the adhesive bond by the vibrations using the piezoelectric element;
exciting the adhesive and/or at least one of the components bonded to the adhesive by the vibrations;
at least one of aging, embrittling and hardening the adhesive by the vibrations in an accelerated manner; and
prior to and/or during the introduction of the vibration, cooling the region of the adhesive joint to a temperature less than its glass temperature.

26. A method for detaching components adhesively bonded to each other, comprising the steps of:
irradiating the region of the adhesive by electromagnetic radiation coming from an emitter and directed to the region of the adhesive without transmission through the components to be detached;
at least partially absorbing the radiation by the adhesive; and
at least decreasing, by causing at least one of an embrittling and a hardening of the adhesive, the adhesive action of the adhesive by the absorbed radiation.

27. The method as recited in claim 26, further comprising the step of selecting a semiconductor laser as an emitter.

28. The method as recited in claim 26, wherein adhesive is at least one of aged, embrittled, hardened, charred or carburized by the radiation.

29. A method for detaching components adhesively bonded to each other, comprising the steps of:
irradiating the region of the adhesive by electromagnetic radiation coming from an emitter;
at least partially absorbing the radiation by the adhesive; and
at least decreasing the adhesive action of the adhesive by the absorbed radiation;
wherein the emitter is already permanently situated in the region of the adhesive joint when the components are adhesively bonded to each other.

30. A device for detaching components adhesively bonded to each other, the components having an adhesive joint with adhesive situated therebetween, comprising:
at least one piezoelectric element configured for mechanical vibrations arranged in a region of the adhesive joint, the piezoelectric element permanently situated in the region of the adhesive joint.

31. A device for detaching components adhesively bonded to each other, the components having an adhesive joint with adhesive situated therebetween, comprising:
an emitter configured for electromagnetic radiation, the radiation having a wavelength that is at least partially absorbed by and causes at least one of an embrittling and a hardening of the adhesive, and the radiation emittable in the region of the adhesive, the emitter configured to direct the radiation to the region of the adhesive without transmission of the radiation through the components to be detached.

32. The device as recited in claim 31, wherein the emitter includes a light source.

33. The device as recited in claim 31, wherein the device includes a conductor for the radiation, the conductor arranged to connect the emitter to the region in which the radiation is radiated into the adhesive.

34. The device as recited in claim 33, wherein the emitter includes a light source, and the conductor includes at least one glass fiber.

35. The device as recited in claim 33, wherein the emitter includes a light source and the conductor includes several glass fibers and/or bundles of glass fibers moveable relatively to each other.

36. A device for detaching components adhesively bonded to each other, the components having an adhesive joint with adhesive situated therebetween, comprising:

an emitter configured for electromagnetic radiation, the radiation having a wavelength that is at least partially absorbed by the adhesive, and the radiation emittable in the region of the adhesive;

wherein the emitter is permanently situated in the region of the adhesive joint.

* * * * *

UNITED STATES PATENT AND TRADEMARK OFFICE
CERTIFICATE OF CORRECTION

PATENT NO. : 6,716,297 B2
DATED : April 6, 2004
INVENTOR(S) : Essig et al.

It is certified that error appears in the above-identified patent and that said Letters Patent is hereby corrected as shown below:

Column 6,
Lines 13, 23, 52, 60 and 62, change "joint" to -- join --;

Column 8,
Lines 4 and 13, change "joint" to -- join --.

Signed and Sealed this

Fourteenth Day of March, 2006

JON W. DUDAS
*Director of the United States Patent and Trademark Office*